(12) United States Patent
Nie

(10) Patent No.: US 10,835,077 B2
(45) Date of Patent: Nov. 17, 2020

(54) COOKING AND BAKING DEVICE WITH SEAMLESSLY-JOINTED GRIDDLE PLATES

(71) Applicant: Jiangmen City Xinhui Henglong Plastic Co., Ltd., Jiangmen (CN)

(72) Inventor: Huayao Nie, Jiangmen (CN)

(73) Assignee: Jiangmen City Xinhui Henglong Innovative Housewares Co., Ltd. (CN)

( * ) Notice: Subject to any disclaimer, the term of this patent is extended or adjusted under 35 U.S.C. 154(b) by 530 days.

(21) Appl. No.: 15/625,603

(22) Filed: Jun. 16, 2017

(65) Prior Publication Data

US 2018/0333001 A1 Nov. 22, 2018

(30) Foreign Application Priority Data

May 22, 2017 (CN) .......................... 2017 1 0364858

(51) Int. Cl.
*A47J 37/06* (2006.01)

(52) U.S. Cl.
CPC ............................... *A47J 37/0611* (2013.01)

(58) Field of Classification Search
CPC . A47J 37/0611; A47J 37/0629; A47J 37/0676
USPC ............ 219/377, 385, 386, 403, 404, 443.1;
99/374–381
See application file for complete search history.

(56) References Cited

U.S. PATENT DOCUMENTS

| | | | | |
|---|---|---|---|---|
| 6,269,738 B1* | 8/2001 | Huang | ................. | A47J 37/0611 99/372 |
| 6,776,085 B1* | 8/2004 | Tang | .................. | A47J 37/0676 219/386 |
| 2004/0050256 A1* | 3/2004 | Patenotre | ............ | A47J 37/0611 99/331 |
| 2004/0217109 A1* | 11/2004 | Chang | ................. | A47J 37/0611 219/525 |
| 2006/0049164 A1* | 3/2006 | Bryan | ................. | A47J 37/0611 219/386 |
| 2008/0245241 A1* | 10/2008 | Rosset | .................. | A21B 5/023 99/375 |

FOREIGN PATENT DOCUMENTS

CN 203388720 U * 1/2014

* cited by examiner

*Primary Examiner* — Hung D Nguyen
(74) *Attorney, Agent, or Firm* — The Farrell Law Firm, P.C.

(57) ABSTRACT

Disclosed is a cooking and baking device with seamlessly-jointed griddle plates, including an upper housing, a lower housing hinged with the upper housing, chambers in the upper housing and the lower housing, griddle plates arranged within the chambers, and a connecting passage communicating with the chambers. Ends of the griddle plates in the upper housing and the lower housing are aligned in the connecting passage, an axis along which the upper housing and the lower housing are rotated is located between the griddle plates of the upper housing and the lower housing, and the axis is arranged to be not higher than top surfaces of the griddle plates. In use, the two griddle plates are tightly engaged, and thus food materials placed therein will not fall out during baking, the service life of the cooking and baking device is prolonged.

7 Claims, 10 Drawing Sheets

COOKING AND BAKING DEVICE WITH SEAMLESSLY-JOINTED GRIDDLE PLATES

PRIORITY

This application claims priority to Patent Application No. 201710364858.X, filed on May 22, 2017, in the Chinese Intellectual Property Office, the disclosure of which is incorporated herein in its entirety by reference.

BACKGROUND

1. Field

The present invention relates to the field of food cooking, and particularly relates to a cooking and baking device with seamlessly-coupled griddle plates.

2. Description of the Related Art

An existing appliance for making bread, sandwich, waffle and other pastries provides a confined space for baking generally by providing griddle plates or griddle plates in two housings, which are covered mutually through a manner of relative rotation of two housings. However, in the prior arts, including the application numbers CN201220403354.7, CN201110030376.3, CN201120029166.8, CN201120344708.0 and CN201120392678.0, the locations of the griddle plates arranged in the housings are far from a rotation axis, and the housings are connected by the rotation axis, which causes a larger gap between the two griddle plates, or the two griddle plates being mutually isolated when the two housings rotate to a tiled place; after the griddle plates are unfolded to put baking materials, during covering the materials are easy to fall on positions outside the griddle plates while covering the griddle plates, such as falling inside a waffle maker or on a table where the waffle maker is placed. In this way, debris and oil in the materials are easy to enter the waffle maker to make the waffle maker be difficult to clean, and even damage the internal structure of the waffle maker. Therefore, it is necessary to design a food cooking and baking device with two griddle plates which are close to a seamless condition during mutual tiling and good sealing performances between the two griddle plates after being covered.

SUMMARY

The present invention is intended to solve the technical problems mentioned above by providing a food cooking and baking device with two griddle plates which are jointed seamlessly while tiled and sealed while closed.

According to the invention, a cooking and baking device with seamlessly-jointed griddle plates comprises an upper housing and a lower housing which are hinged with each other; chambers in the upper housing and the lower housing; griddle plates arranged within the chambers; and a connecting passage, communicating the chambers in the upper housing and the lower housing; wherein ends of the griddle plates in the upper housing and the lower housing are aligned with each other in the connecting passage, an axis along which the upper housing and the lower housing are rotated relatively is located between the griddle plates of the upper housing and the lower housing, and the axis is arranged to be not higher than top surfaces of the griddle plates.

Preferably, at least one of the upper housing and the lower housing is internally provided with an elastic part upwards jacking the griddle plates.

Preferably, the cooking and baking device with seamlessly-jointed griddle plates further comprises a fastener for connecting the griddle plates to the upper housing and/or the lower housing in a removable way.

Preferably, the fastener comprises a stopper that limits a motion displacement of the griddle plates.

Preferably, the stopper comprises a sliding chute arranged on the griddle plates, and a sliding block capable of sliding in the sliding chute, wherein each of the upper housing and the lower housing is provided with the sliding block.

Preferably, both the griddle plates in the upper housing and the lower housing are provided with raised ribs higher than the top surfaces of the griddle plates, and the raised ribs are mutually interlaced after the upper housing and the lower housing are rotationally covered.

Preferably, the upper housing and the lower housing are connected by at least two coaxial hinges, and the connecting passage is formed in space between two adjacent hinges.

Preferably, side walls of the upper housing and the lower housing close to the axis is lower than the height of the axis, and the connecting passage is formed in space between the axis and the side walls.

Preferably, a gap between the griddle plates of the upper housing and the lower housing is no more than 5 mm.

Preferably, a gap between the axis and the top surface of the griddle plates is no more than 2 mm.

Compared with the cooking and baking devices of the prior art, in the cooking and baking device with seamlessly-jointed griddle plates of the present invention, the chambers in the upper housing and the lower housing are communicated through the connecting passage, and the griddle plates in the upper housing and the lower housing can be mutually aligned in the connecting passage, such that the gap between the griddle plates of the upper housing and the lower housing can be greatly reduced relative to it of the prior art, and even seamless joint between the two griddle plates can be achieved. With such a cooking and baking device, before baking, while placed in the griddle plates, materials will not fall from the griddle plates into the cooking and baking device during the closing of the griddle plates. The two griddle plates can be closely engaged with each other while closed, and even have an interference fit therebetween, enhancing the sealing of the griddle plates closed, and thus the materials will not fall from the two griddle plates during baking. The cooking and baking device of the invention is easy to wash and difficult to damage, so that the materials will not be wasted, and the service life of the cooking and baking device is prolonged.

BRIEF DESCRIPTION OF THE DRAWINGS

The specific embodiments of the present invention will be further described hereinafter in details with reference to the drawings, wherein.

DETAILED DESCRIPTION

Figure 1:
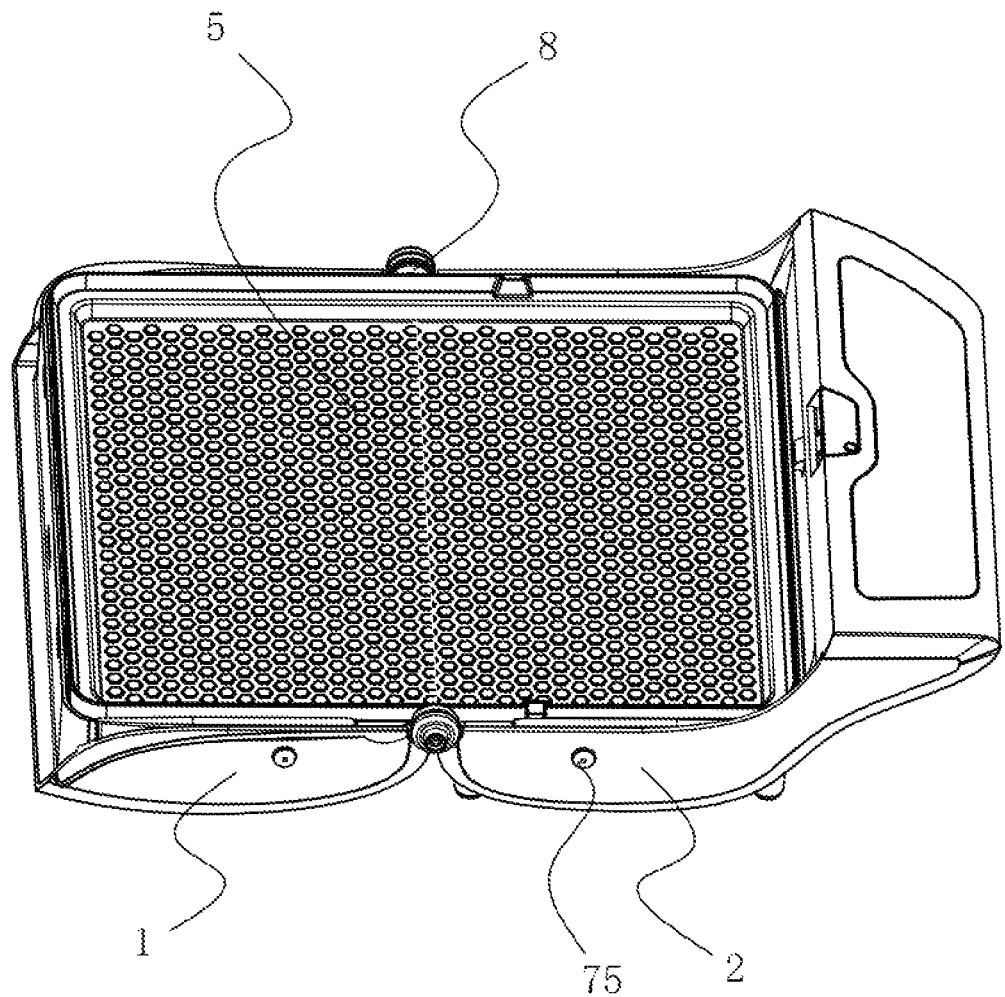
FIG. 1 is a schematic view of setting an integral plate for baking on a cooking and baking device.

A cooking and baking device with seamlessly-jointed griddle plates comprises an upper housing 1 and a lower housing 2 hinged with each other, wherein both the upper housing 1 and the lower housing 2 have a chamber 3 therein, and are provided with griddle plates 5 arranged within the chamber 3, the chambers 3 of the upper housing 1 and the lower housing 2 are intercommunicated through a connecting passage 4. the griddle plates 5 in the upper housing 1 and the lower housing 2 are mutually aligned with end portions thereof in the connecting passage 4, an axis along which the upper housing 1 and the lower housing 2 are relatively rotated is located between the griddle plates 5 of the upper housing 1 and the lower housing 2, and the axis is no higher than top surfaces of the griddle plates 5.

As shown in FIGS. 1 to 8, the upper housing 1 and the lower housing 2 may have a rotation angle of at least 180 degrees, such that the upper housing 1 and the lower housing 2 can be rotated from a closed condition to a tiled condition by the at least 180 degrees relative rotation. The chambers 3 in the upper housing 1 and the lower housing 2 are arranged on opposite directions while mutually covered to form an overall chamber, and the griddle plates 5 of the upper housing 1 and the lower housing 2 in the overall chamber can be mutually covered to form confined space for food baking. The chambers 3 in the upper housing 1 and the lower housing 2 while tiled are communicated by the connecting passage 4. The upper housing 1 and the lower housing 2 may be connected by at least two coaxial hinges 8, and the connecting passage 4 may be formed in space between two adjacent hinges 8. Side walls 9 of the upper housing 1 and the lower housing 2, close to the axis along which the upper housing 1 and the lower housing 2 are rotated relatively, may be lower than the height of the axis, and the connecting passage 4 is formed in space between the axis and the side walls 9.

As shown in FIGS. 1-3 and 10, two griddle plates 5 arranged in the upper housing 1 and the lower housing 2 can be moved into the connecting passage 4, and where the two griddle plates 5 can be aligned with each other. Herein the term "aligned" refers to more than two objects are placed in a line or arranged so as to be parallel or straight. To be specific, in the connecting passage 4, the two griddle plates 5 are close to each other, the gap between the them may be no more than 5 mm. the gap is configured to avoid the collision of the two griddle plates 5 during relative rotation, especially when the axis along which the two griddle plates 5 are rotated relatively is lower than the top surfaces of the griddle plates 5. The distance between the axis along which the two griddle plates 5 are rotated relatively and the top surfaces of the griddle plates 5 may be no more than 2 mm, the axis along which the two griddle plates 5 are rotated relatively is arranged to be slightly lower than the top surface of the griddle plates 5 for allowing the griddle plates 5 to have an interference fit while the griddle plates 5 are being closed and to be sealed preferably. In addition, with the aid of the gap between the two griddle plates 5, collisions of the two griddle plates 5 during relative rotation can be effectively eliminated.

Figure 2:
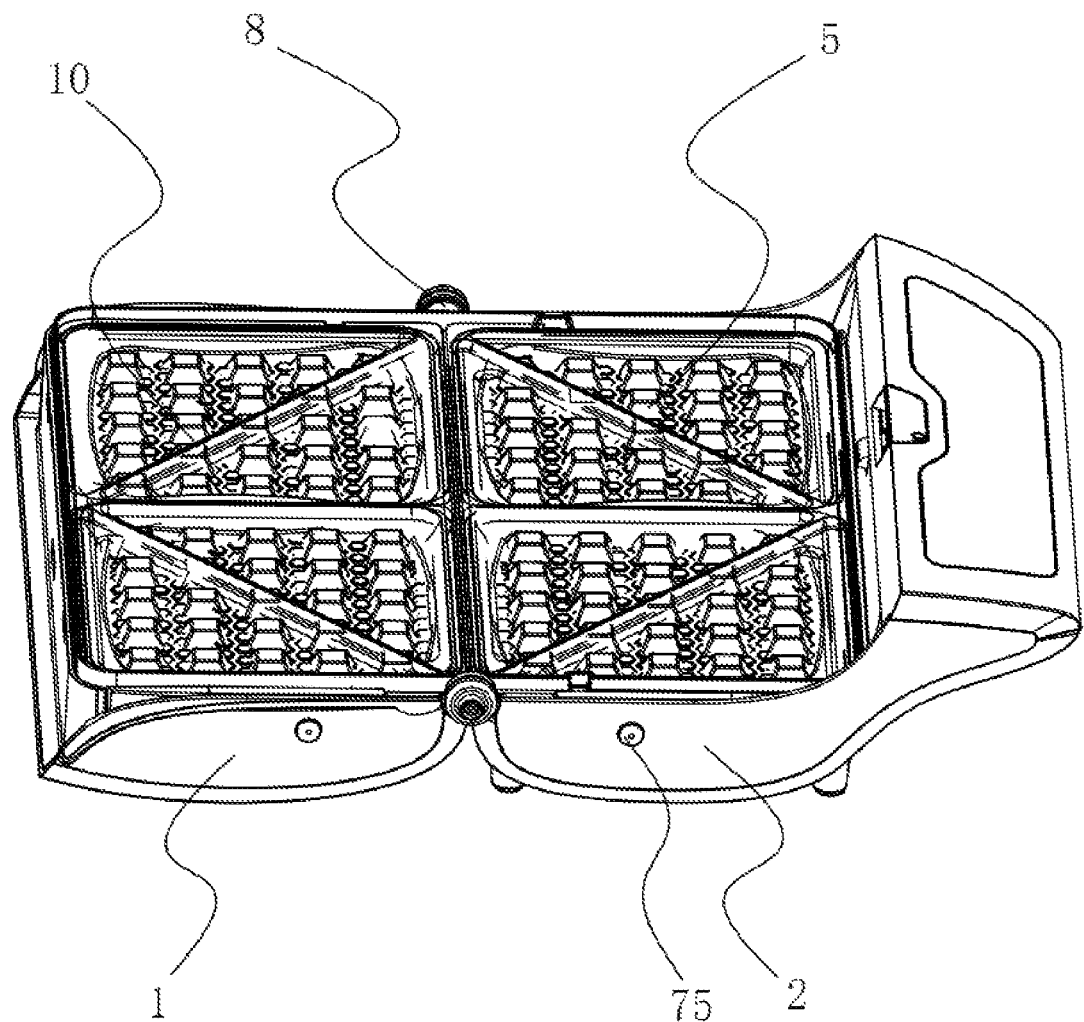
FIG. 2 is a schematic view of setting a griddle plates for waffle on the cooking and baking device.
Figure 3:
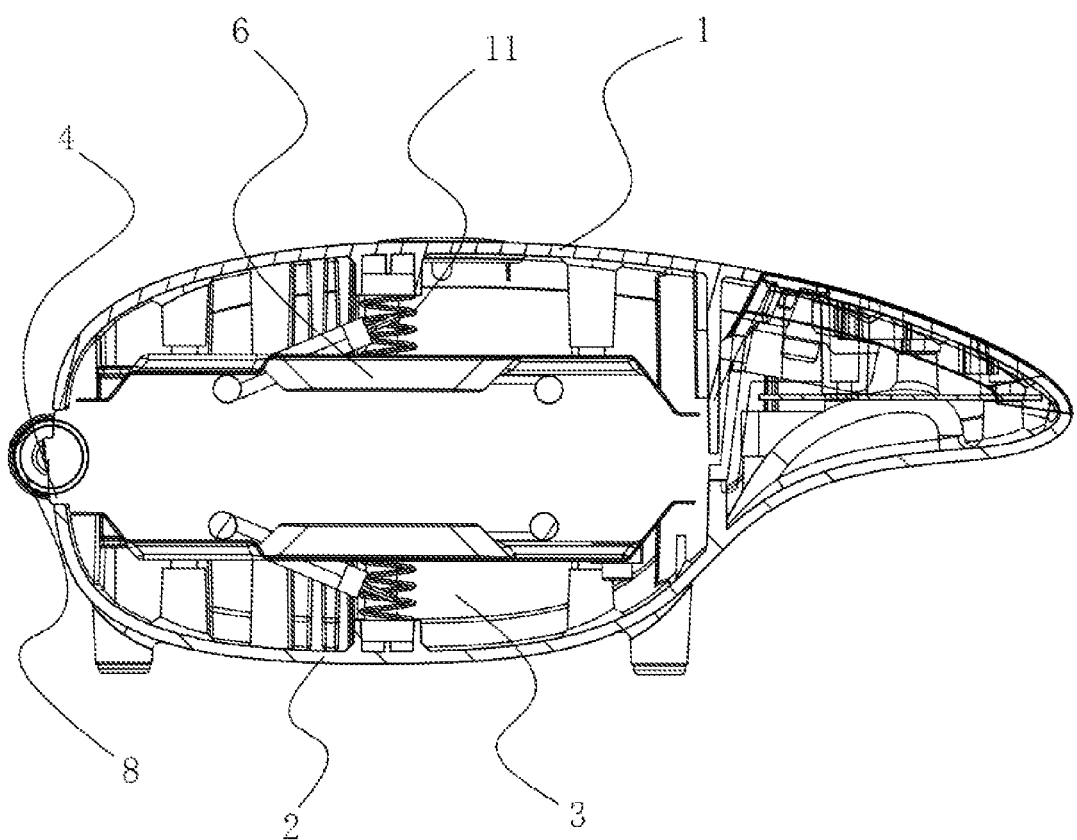
FIG. 3 is a sectional view the cooking and baking device closed and with the griddle plates removed.
Figure 10:
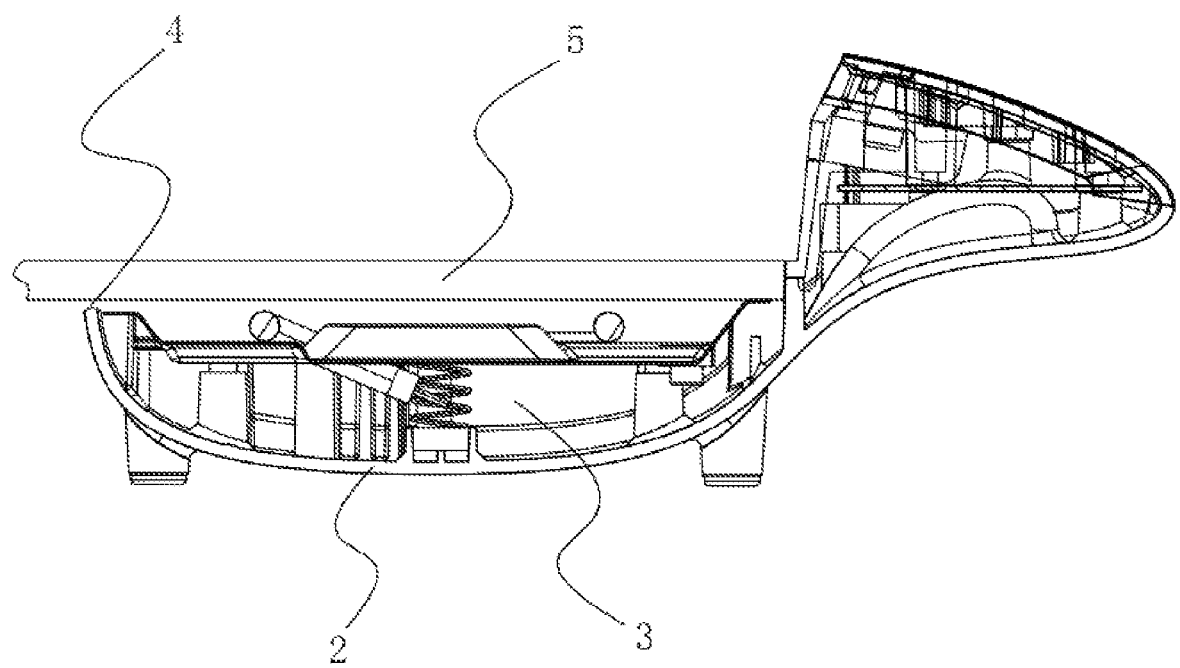
FIG. 10 is a structure diagram illustrating that the griddle plates extends from a chamber to a connecting passage.

As shown in FIGS. 2, 3 and 10, by providing the connecting passage 4, the gap between the two griddle plates 5 is greatly reduced, relative to it of the prior art, and even the seamless joint of the two griddle plates 5 can be achieved according to the invention. Since the axis along which the two griddle plates 5 are rotated relatively is on the same horizontal level as the top surfaces of the two griddle plates 5, the two griddle plates 5 can be jointed seamlessly in the connection passage 4. In this way, materials placed in the griddle plates 5 of a cooking and baking device before baked, will not fall out from the griddle plates into the body of the cooking and baking device during the closing of the griddle plates 5. While the axis is not higher than the top surfaces of the griddle plates 5 tiled, the two griddle plated are tightly closed, even have an interference fit therebetween, the sealing performance of the griddle plates 5 closed is enhanced, resulting in easy washing, excellent robustness and enhanced durability.

As shown in FIGS. 3 to 6, in order to increase the sealing of the griddle plates 5 in the upper housing 1 and the lower housing 2 while closed, the axis along which the two griddle plates 5 are rotated relatively may be lower than the top surfaces of the griddle plates 5. In this way, the two griddle plates 5 may have an interference fit therebetween while closed, so as to have a tighter engagement. In view of possible abrasion to the griddle plates 5 after multiple times of closing with squeezing, the upper housing 1 and/or the lower housing 2 may be internally provided with an elastic part 11 for upwards jacking the griddle plates 5. The elastic part is configured to buffer the squeezing force between two griddle plates 5 closed, i.e. the two griddle plates 5 are elastically engaged. The abrasion loss of the two griddle plates 5 is reduced without compromising the sealing performance between the two griddle plates 5 while they are closed. The pre-tightening force of the elastic part 11 allows the top surfaces of the griddle plates 5 in the upper housing 1 and the lower housing 2 to be arranged higher than the axis along which the two griddle plates 5 are rotated relatively through, so that the two griddle plates 5 can have tighter engagement while they are closed and better sealing performance.

The elastic part 11 may be a pressure spring arranged between the griddle plates 5 and the upper housing 1, and between the griddle plates 5 and the lower housing 2. Each of the upper housing 1 and the lower housing 2 are provided with a fixed seat sheathed on the pressure spring. The elastic part 11 may also be a torsional spring, the torsional spring is fixed on the side wall 9 of the upper housing 1 or the lower housing 2 with one end thereof, and connected to the griddle plates 5 with another end thereof.

As shown in FIGS. 4, 6, 7 and 8, the cooking and baking device with seamlessly-jointed griddle plates further comprises a fastener 7 for connecting the griddle plates 5 to the upper housing 1 and/or the lower housing 2 in a removable manner. The fastener 7 is configured to match with the elastic part 11 to control the displacement of the griddle plates 5. Specifically the fastener 7 comprises a stopper that limits the displacement of the griddle plates 5. The stopper comprise a sliding chute 71 arranged on the griddle plates 5, and correspondingly a sliding block 72 capable of sliding in the sliding chute 71 are arranged on both the upper housing 1 and the lower housing 2. The fastener 7 may further comprise a plurality of positioning holes 76 on the upper housing 1 and the lower housing 2, and positioning lugs 77 arranged on the griddle plates 5, corresponding to the positioning holes 76. The sliding block 72 slides in or out the sliding chute 71 through rotation of a lever 74 which is connected to a tension spring 73 with one end thereof, and the tension spring 73 is fixed on the upper housing 1 or the lower housing 2 with an end thereof. The tension spring 73 is used for providing the pre-tightening force to keep the sliding block 72 in the sliding chute 71 in ordinary state, the lever 74 is connected to a button 75 with another end thereof, and the force applied by the button 75 to push the lever 74 may be on the same direction as the pre-tightening force of the tension spring 73.

As the tension spring 73 is stretched by the lever 74 in rotation, the sliding block 72 is rotated out from the sliding chute 71. The griddle plates 5 can be taken out from the upper housing 1 or the lower housing 2 with such a mechanism that the sliding chute 71 and the sliding block 72 can be separated with each other, thereby facilitating the replacement of the griddle plates 5. Through the relative sliding of the sliding chute 71 and the sliding block 72, the griddle plates 5 can be moved within the set motion displacement under the squeezing of the elastic part 11, and the control over the displacement is to prevent the griddle plates from ejecting from the upper housing 1 or the lower housing 2.

As shown in FIG. 2, the griddle plates 5 in both the upper housing 1 and the lower housing 2 may be provided with raised ribs 10. The raised ribs 1 of the griddle plates 5 may vary in shape for different types of different foods, such as waffle, sandwich, toast and other biscuits of different shapes. The shape of the raised rib 10 may be determined according to actual demands of the foods to be baked. The raised ribs 10 may be higher than the top surfaces of the griddle plates 5, and mutually interlaced while the upper housing 1 and the lower housing 2 are rotated to close. The raised ribs 10 interlaced may fit closely with each other. While the two griddle plates 5 are closed with a manner of interlaced fit, each of the chambers formed by the surrounding raised ribs 10 can provide excellent sealing performance and high food baking efficiency. The raised ribs 10 may flush with the top surfaces of the griddle plates 5, and thus the raised ribs 10 can be in interference fit as well under the pre-tightening force of the elastic part 11, which can improve the sealing performance of the griddle plates 5 while closed.

As shown in FIGS. 4, 6, 7 and 9, the fastener 7 comprises a plurality of positioning holes 76 arranged on the upper housing 1 and the lower housing 2, and positioning lugs 77 arranged on the griddle plates 5, corresponding to the positioning holes 76. The positioning lugs 77 may be arranged at lateral sides of the griddle plates 5, and the positioning holes 76 are arranged correspondingly to the positioning lugs 77. Before fixing the griddle plates 5 by mating the bulge 72 to the recess 71, the positioning lugs 77 are inserted into the positioning holes 76 to limit the position of the griddle plates 5, and then the griddle plates 5 are gradually pressed into the chambers 3 of the upper housing 1 and the lower housing 2, and fastened by the bulge 72 and the recess 71 mated. The griddle plates 5 can be installed quickly with the cooperation of the positioning lugs 77 and the positioning holes 76.

Figure 4:
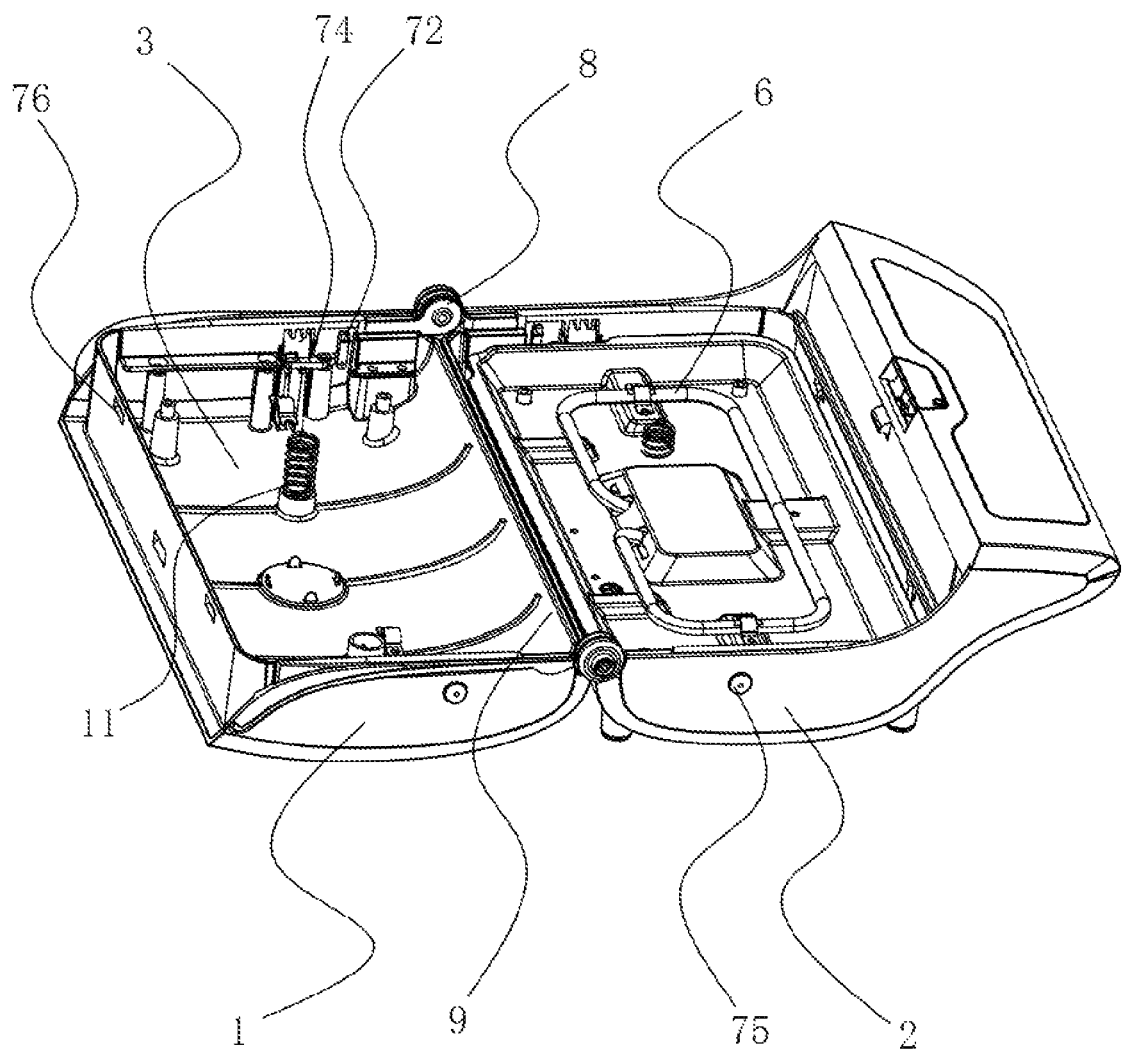
FIG. 4 is a partial schematic view of the cooking and baking device tiled.

As shown in FIGS. 1, 2 and 4, the upper housing 1 and the lower housing 2 are connected by at least two coaxial hinges 8, and the connecting passage 4 is formed in the space between two adjacent hinges 8. The hinges 8 serves as a connecting part between the upper housing 1 and the lower housing 2, and therefore no actual rotation shaft is required to hinge the upper housing 1 and the lower housing 2 together, so that the space required for connecting the upper housing 1 and the lower housing 2 is saved and thereby to provide enough room for forming the connecting passage 4 in which the overall griddle plate is placed.

The hinges 8 may provide a damping force. After the upper housing 1 and the lower housing 2 are closed, a latch fastener may be used to hold the relative position of the upper housing 1 and the lower housing 2 for purpose of enclosed baking. While the enclosed baking is complete, once the latch fastener is loosened, the upper housing 1 is bounced up under the damping force of the hinges 8, the two griddle plates 5 are separated, and steam in the two griddle plates 5 is dispersed. That is, after the baking no manual operation is needed for the separation of the upper housing 1 and the lower housing 2, preventing hands from being scalded. The damping force of the hinges 8 may be provided by a torsion spring arranged in the hinges 8.

Figure 5:
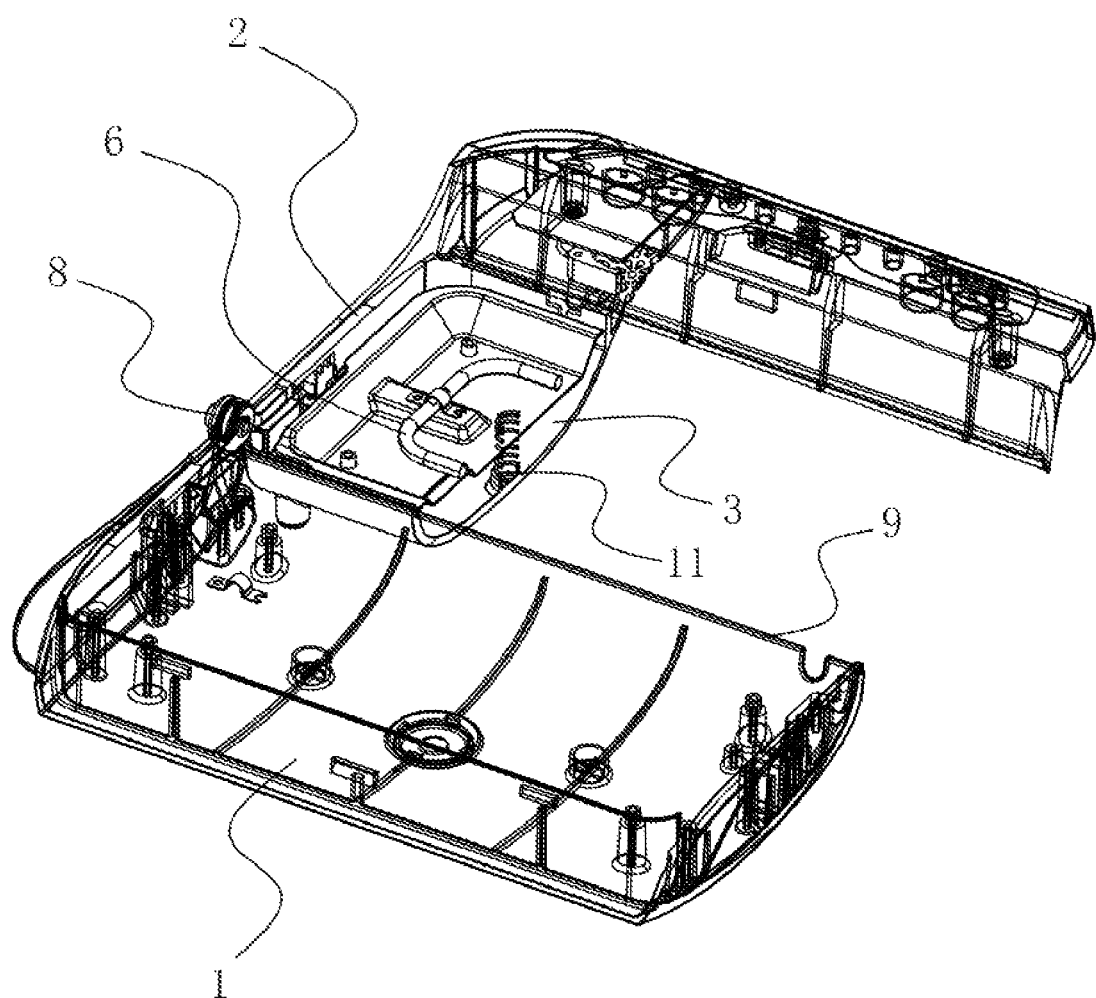
FIG. 5 is a partial sectional view of the cooking and baking device tiled.
Figure 6:
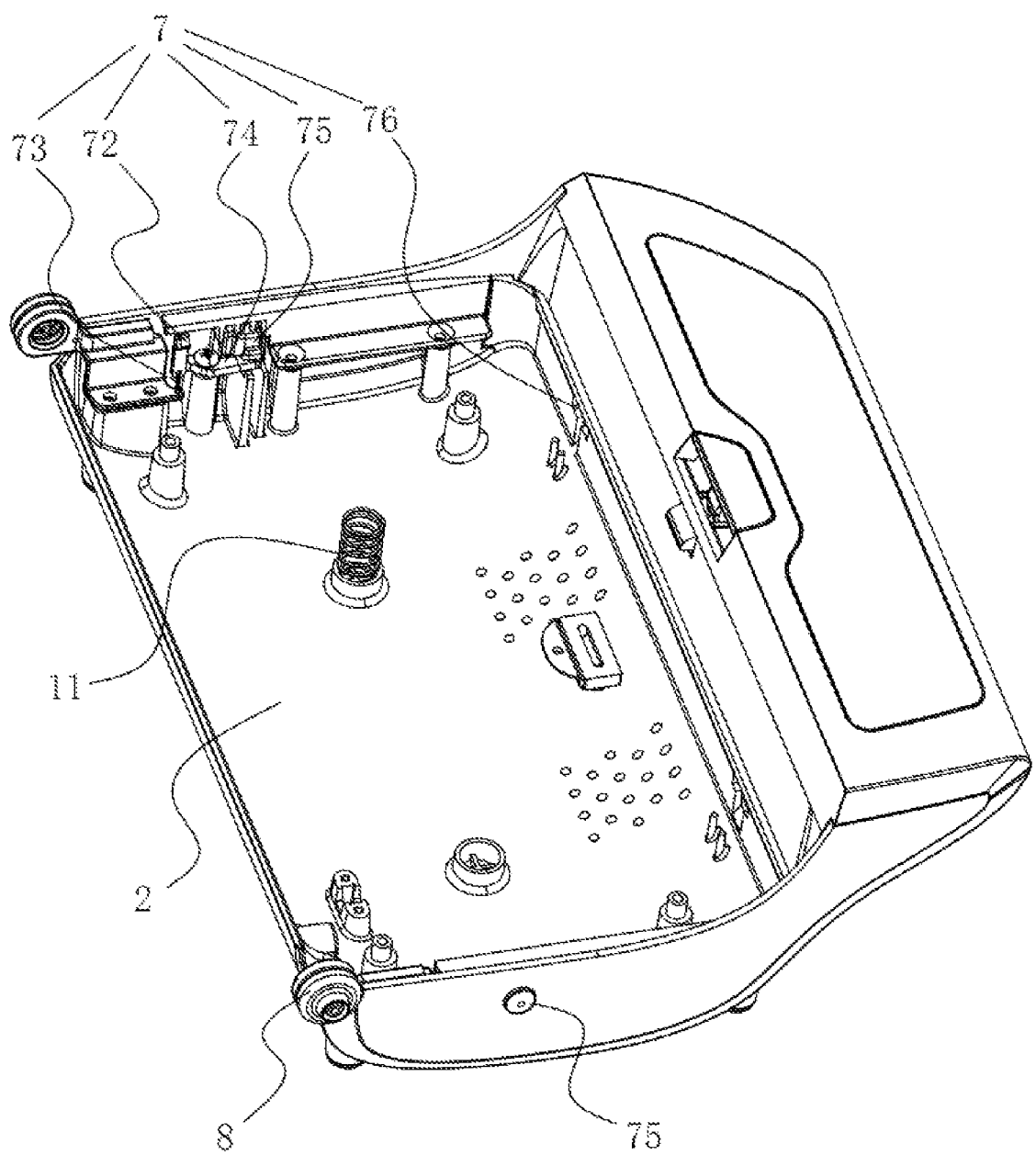
FIG. 6 is a structure diagram of a lower housing part of the cooking and baking device.
Figure 7:
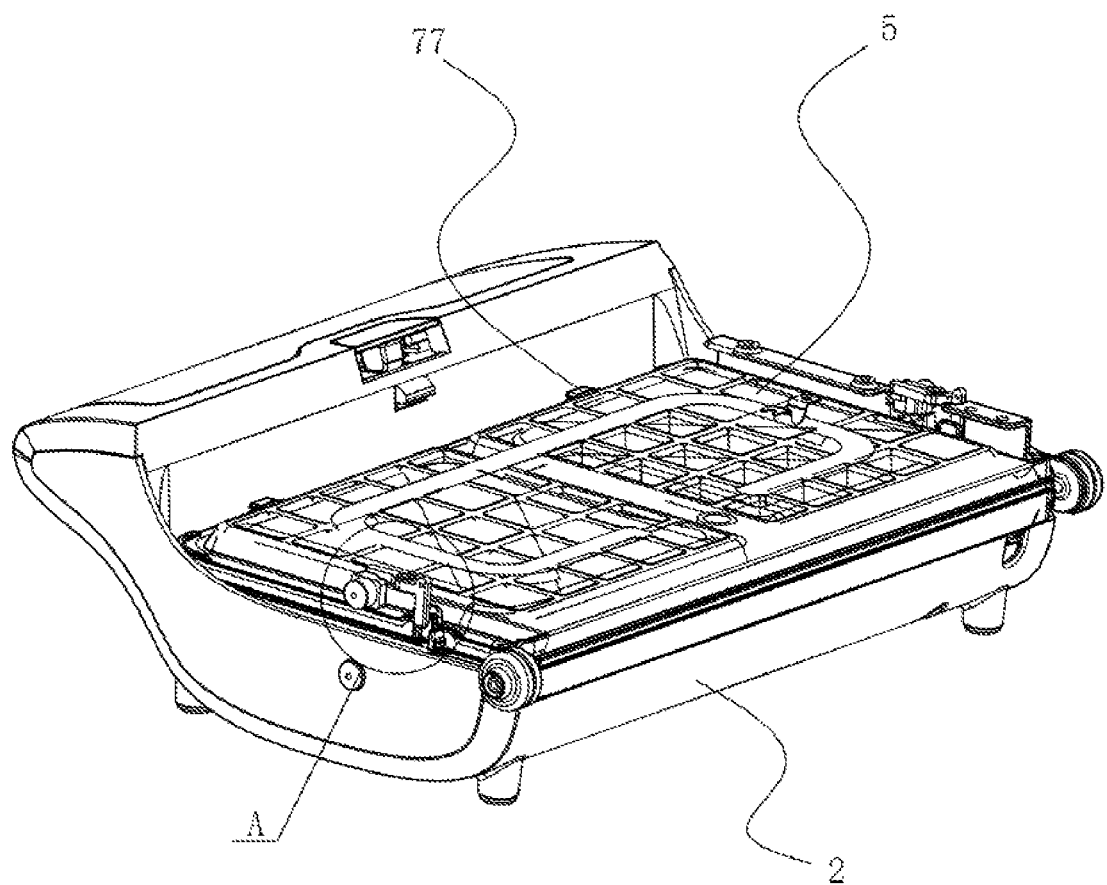
FIG. 7 is a structure diagram of the lower housing part of the cooking and baking device.
Figure 8:
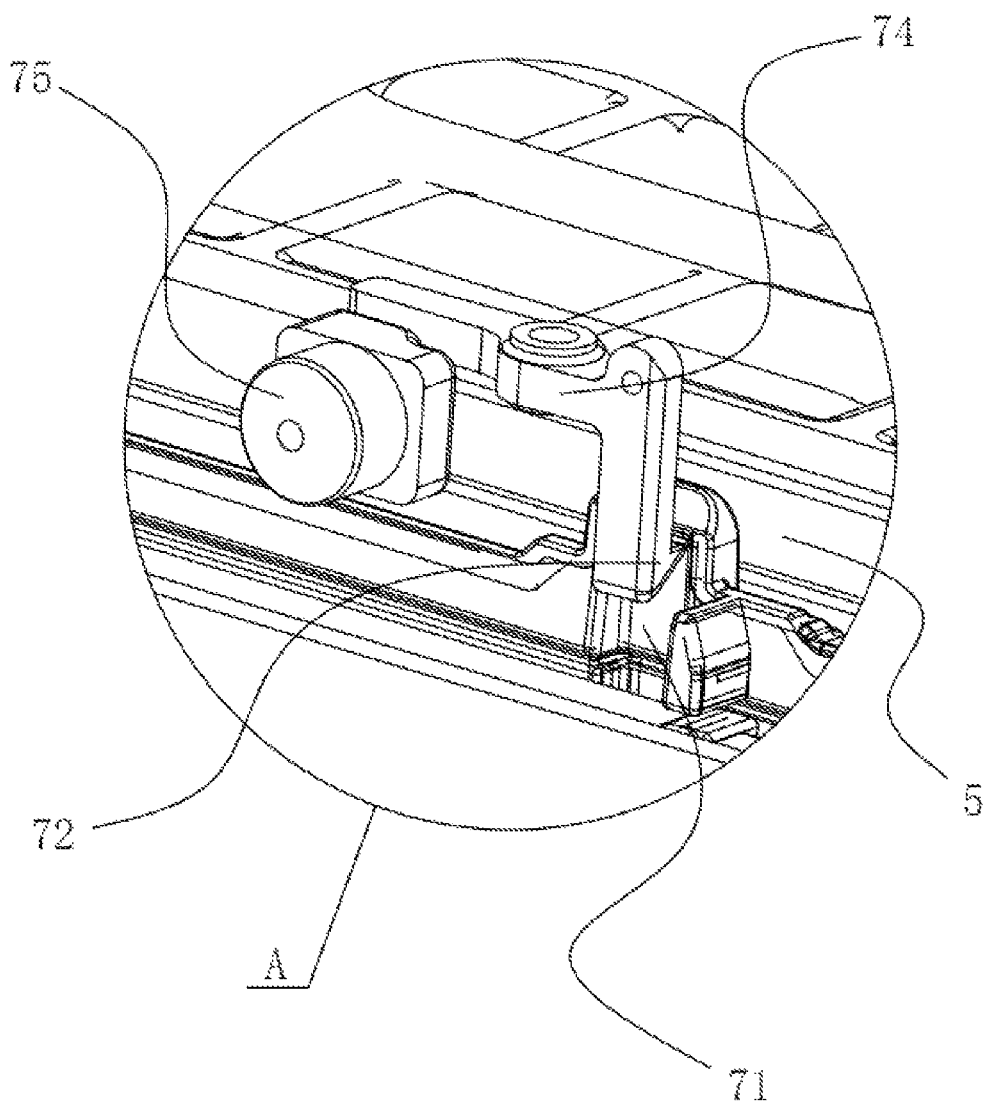
FIG. 8 is a partial enlarged diagram of a part A in FIG. 7.

As shown in FIG. 5, the adjacent walls 9 of the upper housing 1 and the lower housing 2 are lower than the axis along which the upper housing 1 and the lower housing 2 are rotated relatively. The griddle plates 5 are arranged between the adjacent walls 9 of the upper housing 1 and the lower housing 2 and the axis, and supported by the adjacent walls 9. Grooves receiving the adjacent walls 9 may be arranged at the bottoms of the griddle plates 5 and serve as auxiliary positioning in installing the griddle plates 5.

Figure 9:
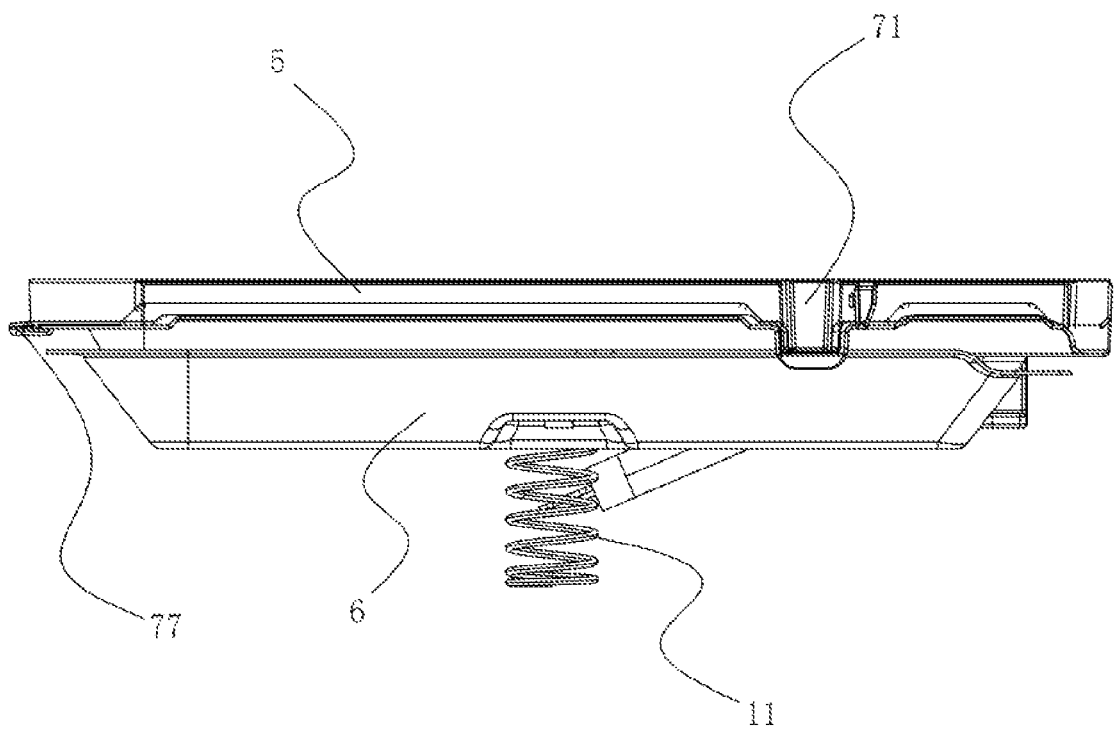
FIG. 9 is a connection structure diagram of a griddle plates and an elastic part.

As shown in FIGS. 4, 5, and 9, a heating element 6 is arranged under one of the griddle plates 5 in the chambers 3. The heating element 6 may be a heating plate in close fit with and under the griddle plate 5, in which a heating tube is wound, or a heating tube directly arranged under the griddle plate 5 and a support for fixing the heating tube. When the heating element 6 is comprised of the heating plate and the heating tube, the heating plate is provided with a trough in which the heating tube is placed. The heating plate may be tightly attached to the griddle plate 5 under the pressure produced by the elastic part 11. The heating plate may be higher than the adjacent walls 9 of the upper housing 1 and the lower housing 2. In this way, the close contact between the heating plate and the griddle plate 5 may be maintained during the process of replacing the griddle plates under the action of the elastic part 11. Furthermore, the elastic part 11 can apply upward pretension force on the griddle plates 5 after the griddle plates 5 are fixed, such that, with the cooperation of the fastener 7, the griddle plates 5 can be securely fixed on the upper housing 1 and the lower housing 2 after installation. In this case, the recess 71 of the fastener 7 may be formed in a vertical bar shape allowing the bulge 72 to move vertically therein, thereby facilitating the adjustment of the position of the griddle plates 5 relatively to the upper housing 1 and the lower housing 2 as well as quickly removing the griddle plates 5.

The heating element 6 may be lower than the axis along which the upper housing 1 and the lower housing 2 are relatively rotated, and the connecting passage 4 is formed in the space between the axis and the heating element 6. The griddle plates 5 may be supported by the heating plate in the heating element 6. When the upper housing 1 and the lower housing 2 lie flat, the heating plates in the upper housing 1 and the lower housing 2 can simultaneously support the griddle plates 5 under the action of the elastic part 11, and quickly and uniformly transfer the heat of the heating plates to the griddle plates 5.

For various cooking and baking modes, the cooking and baking device of the invention may comprise a power source module and a temperature control module for controlling the heat productivity of the heating element 6, and may further comprise a temperature sensor module for sensing the actual temperature in cooking and baking process and based on the temperature sensed to control the heat productivity of the heating element 6.

The power source module is used to supply power needed by the heating element 6 through a battery or a supply circuit. In the latter, the cooking and baking device is electrified by a plug. i.e., an adapter is used to converse the alternate current from the mains supply into the steady direct current for fulfill the requirement of the live parts of the cooking and baking device in power supply.

The temperature sensor module comprises a temperature sensor arranged in the upper housing 1, the lower housing 2 or the griddle plates 5. The temperature sensor may be a universal thermos resistive or thermocouple sensor. The temperature real-time sensed by the temperature sensor is fed back to the temperature control module, and the heating productivity of the heating element 6 can thus be regulated by controlling the output voltage of the temperature control module. The temperature sensor module further comprise a bimetal strip thermostat arranged on the supply circuit of the heating element 6. When the temperature sensor detects in real time that the cooking and baking temperature exceeds a risk threshold, the temperature sensor disconnects the supply circuit to power off the heating element 6.

The cooking and baking device further comprises a display module. The display module comprises an LED display. The LED display is used to display related information, for example the real time temperature, for the purpose of monitoring, according to a current mode of the cooking and baking device. Considering that different cooking and baking modes require different heat productivity of the heating element 6, for each of the cooking and baking modes, a relatively optimal temperature range is required. The thermostatic control corresponding to a specific cooking and baking mode may be set by a function button on the upper housing 1 or the lower housing 2, the modes can be switched by pressing the function button. While the mode is switched over, the heating productivity of the heating element 6 is controlled by the temperature control module according to an optimal temperature value corresponding to the cooking and baking mode to be selected. In the cooking and baking process, the temperature is maintained constant as the actual temperature is corrected based on a temperature signal fed back by the temperature sensor.

The cooking and baking device of the invention further comprises a buzzer. The buzzer can prompt the user upon the completion of cooking and baking process. The time for cooking and baking can be manually set. In this case, the buzzer prompts the user after the manually set time is up. The buzzer may be further connected with the temperature sensor, and in case the actual temperature in the griddle plates 5 is higher than the set value or the temperature sensor is failed, alarm and prompt the user. The display module may be provided with a corresponding fault alarm lamp.

The cooking and baking device of the invention may comprise a heat dissipation module. The heat dissipation module may be a cooling fan powered by the power source module. The cooling fan may be arranged in the chambers 3 of the upper housing 1 and the lower housing 2, preferably, in space between the heating element 6 and the upper housing 1 or the lower housing 2. Either the upper housing 1 or the lower housing 2 may be provided with a heat vent. The heat dissipation module can quickly dissipate the heat produced by the heating element 6 and retained in the upper housing 1 or the lower housing 2. Besides, moisture and odor can be taken away by air circulation flow.

The embodiments above are not limited to the technical solutions of the embodiments thereof, and the embodiments may be combined to form new embodiments. The embodiments above are only used for illustrating the technical solutions of the invention instead of limiting. Any amendment or equivalent replacement not departing from the spirit and scope of the invention shall all fall with the scope of the technical solutions of the invention.

What is claimed is:

1. A cooking and baking device with seamlessly-jointed griddle plates, comprising:
    an upper housing;
    a lower housing hinged with the upper housing;
    griddle plates arranged within chambers; and
    a connecting passage communicating with chambers in the upper housing and the lower housing,
    wherein the upper housing and the lower housing are provided with the chambers therein,
    wherein ends of the griddle plates in the upper housing and the lower housing are aligned with each other in the connecting passage, an axis along which the upper housing and the lower housing are rotated relatively is located between the griddle plates of the upper housing and the lower housing,
    wherein the upper housing and the lower housing are rotatable relative to one another by 180 degrees between a closed position and an opened position,
    wherein in the opened position, the axis is arranged to be not higher than top surfaces of the griddle plates, and a gap between the griddle plates of the upper housing and the lower housing is less than or equal to 5 millimeters,
    wherein in a closed position, the griddle plates are closed and face to face with each other,
    wherein side walls of the upper housing and the lower housing close to the axis are below the axis,
    wherein the connecting passage is formed in a space between the axis and the side walls, and
    wherein a gap between the axis and the top surfaces of the griddle plates is less than or equal to 2 millimeters.

2. The cooking and baking device with seamlessly-jointed griddle plates according to claim 1, wherein at least one of the upper housing and the lower housing is internally provided with an elastic part upwardly jacking the griddle plates.

3. The cooking and baking device with seamlessly-jointed griddle plates according to claim 1, further comprising a fastener for connecting the griddle plates to the upper housing and/or the lower housing in a removable way.

4. The cooking and baking device with seamlessly-jointed griddle plates according to claim 3, wherein the fastener comprises a stopper that limits a motion displacement of the griddle plates.

5. The cooking and baking device with seamlessly-jointed griddle plates according to claim 4, wherein the stopper comprises a sliding chute arranged on the griddle plates, and a sliding block capable of sliding in the sliding chute, wherein each of the upper housing and the lower housing is provided with the sliding block.

6. The cooking and baking device with seamlessly-jointed griddle plates according to claim 1, wherein both the griddle plates in the upper housing and the lower housing are provided with raised ribs higher than the top surfaces of the griddle plates, and the raised ribs are mutually interlaced after the upper housing and the lower housing are rotationally covered.

7. The cooking and baking device with seamlessly-jointed griddle plates according to claim 1, wherein the upper housing and the lower housing are connected by at least two coaxial hinges, and the connecting passage is formed in space between two adjacent hinges.

\* \* \* \* \*